Figure 1:
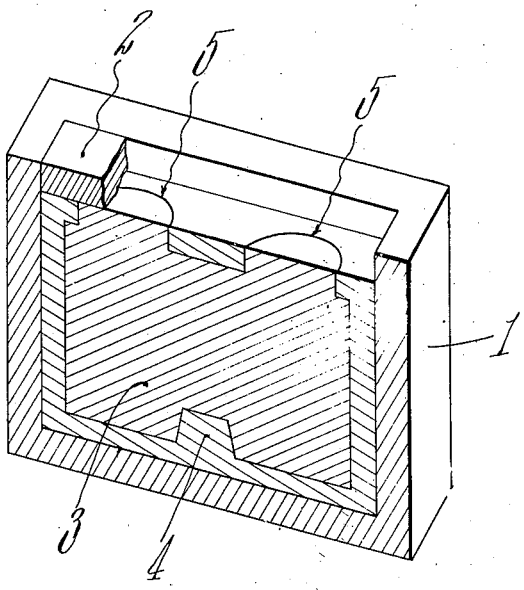

Sept. 22, 1925.

M. ALDEN 1,554,697

MANUFACTURE OF HOLLOW ARTICLES

Filed July 18, 1921

INVENTOR
Milton Alden,
BY Chapin & Neal
ATTORNEYS

Patented Sept. 22, 1925.

1,554,697

UNITED STATES PATENT OFFICE.

MILTON ALDEN, OF LONGMEADOW, MASSACHUSETTS.

MANUFACTURE OF HOLLOW ARTICLES.

Application filed July 18, 1921. Serial No. 485,713.

*To all whom it may concern:*

Be it known that I, MILTON ALDEN, citizen of the United States, residing at Longmeadow, in the county of Hampden and State of Massachusetts, have invented new and useful Improvements in the Manufacture of Hollow Articles, of which the following is a specification.

The present invention relates to the manufacture of hollow articles and more particularly to the art of molding hollow articles from plastic material such, for example, as certain of the various synthetic compounds of phenol and aldehydes.

In practicing the well-known methods of making hollow articles with the aid of a mold and a core, more or less difficulty is usually experienced in extracting the core from the completed article. Often the size or location of the opening leading to the interior of the article is such that the core cannot be removed intact but must be broken up in some way or other before it can be dislodged from the surrounding material. Obviously it is entirely impracticable to reproduce by the practice of such methods many desirable designs on account of the difficulty of finally separating the core from the article.

One of the objects of this invention is to improve the processes heretofore employed in the manufacture of hollow articles for the purpose of facilitating the removal of the core after the article has been formed and thus rendering the process applicable to the production of articles of a wider variety of designs.

With this end in view, one feature of the invention contemplates the molding or shaping of temporarily plastic or other material about a core soluble in water, and the subsequent dissolving of the core in water to enable it to readily detach itself from the surrounding portions of the article.

Another object of the invention is to provide means for carrying out the above described process.

The invention further consists in the features set forth in the following description and particularly defined in the appended claims, the advantages of which will be apparent to those skilled in the art.

The invention will be hereinafter described in what is at present considered its most important and advantageous application from a commercial point of view, viz., to the art of molding hollow articles from synthetic compounds of phenol and aldehyde and particularly from those compounds known commercially as phenolic condensation products. In molding said hollow articles, it is desirable that the core used in the molding process shall have a higher melting point than the melting point of the material which is being molded, and also, that it shall have a coefficient of cubical expansion approximately equal to that of said material.

The necessity that the core shall have a higher melting point than that of the material being molded, arises from the fact that in the molding process the mold and the core and the material are all heated, and in order to preserve the interior shape of the finished article, which is given to it by the core, it is necessary that the core should not melt or soften appreciably during the molding process, that is, while heat is being applied to the material which is being molded, in order to render it plastic.

These different characteristics are possessed by sodium chloride or common table salt and for that reason a core made of sodium chloride is an excellent one for the particular purposes hereinbefore set forth. It is to be understood however that this is only one of many examples of the utility of the invention and that the same may advantageously be applied to many processes of molding, casting, diecasting or the like. The scope of the invention is therefore to be determined from the claims rather than from the following description.

The invention will now be explained in connection with the accompanying drawings in which,—

Figure 2:
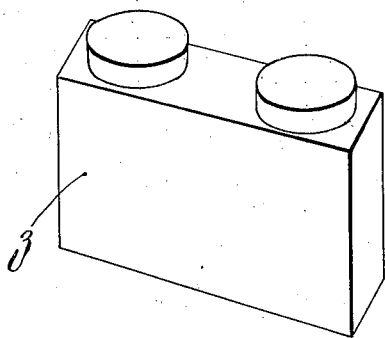

Fig. 1 is a view, partially in vertical longitudinal section and partially in perspective of a mold and a core constructed and assembled in accordance with the present invention, the cavity between the mold and the core having been filled with plastic material to form a hollow article; and Fig. 2 is a perspective view of the core.

The illustrated device comprises a mold and a core. The mold may be of any suitable construction. As shown, the mold comprises the usual chase or mold body 1 and the force or plunger 2, these parts being shaped to determine the exterior contour of the article to be produced. The core is indicated at 3 and is shaped to determine the contour of the interior of the article to be molded.

The illustrated mold and core are designed to produce a hollow article of rectangular prismatic shape having a boss 4 formed upon one of its inner faces and a pair of openings 5 extending through one of its side walls.

In accordance with the present invention, the core 2 is constructed of soluble material so that after an article has been molded and has been taken from the mold the core may be dissolved and removed from the interior of the article. It is preferred to make the core of common table salt sodium chloride (NaCl) since this substance is cheap and has been found to be in every way suitable for the purpose.

In making the core, the salt crystals are pressed together in a suitable mold under high pressure with the result that a solid core is produced having a uniformly smooth, hard surface showing little, if any, evidence of crystalline structure.

The pressure employed in molding material, such as a phenolic condensation product, in the process, is approximately 1800 pounds per square inch.

The pressure employed in molding the core for phenolic condensation products, or any other material, in this process, must be greater than the pressure which is employed in molding the material, so that the core will stand up and keep its shape while the material is being molded. The core being made of salt, which is of a crystalline nature, when compressed forms a soluble material, the crystals of which are pressed closely together, so that the finished compacted core becomes homogeneous in is structure. The core made from the salt and compressed as aforesaid is, however, of such a character and density that when the material being molded contracts, due to the cooling thereof, the core will be further compressed and contracted by the force of the shrinking material which is being molded.

In making articles from phenolic condensation products or other plastic molding material, the cavity between the mold and the core is charged with a phenolic condensation product or the like in an uncured state and the mold, together with the core and the interposed charge of material, which is indicated at 4, is subjected simultaneously to high pressure and high temperature, preferably in a steam heated hydraulic press. The material in the mold cavity first softens and becomes plastic under the effect of the heat and then flows freely under the influence of the pressure throughout the form of the mold. The continued application of heat causes the material to harden and set into a solid mass which will not again be rendered plastic by further heating.

The molding operation has now been completed and after the molded article has cooled sufficiently it is taken from the mold. The next step in the process is the removal of the core from the interior of the article. In accordance with the present invention this is easily accomplished by turning a stream of water into one of the openings 5. The water will gradually dissolve the core which will be carried off with the water.

By the use of the salt core above described, the inner faces of the molded article, as well as the edges of any openings which may extend through the walls thereof will be exceptionally smooth so that no subsequent machining operations will be required. This is an important feature inasmuch as smoothness of the molded faces and edges is usually highly desirable. This is particularly true in the case of molded articles of bakelite, condensite or the like, which are to be used as insulators or casings for electrical apparatus.

It is to be understood that the invention is not limited to the employment of cores formed of salt inasmuch as various other materials may be found equally well suited for the purpose, it being only essential that the material used be soluble either in water or some other solvent and that the melting point of the material composing the core be higher than the molding temperature.

Having thus set forth the nature of the invention, what is claimed is,—

1. The process of making hollow articles which consists in introducing unsolidified material into the cavity between a mold and a solid core soluble in water and having a higher melting point than that of said material, applying pressure and heat to said material to render it temporarily plastic and shape it to the contour of the mold and core, reducing the temperature of the molded material to enable it to solidify, removing the solidified material together with the core from the mold, and dissolving the core and extracting the solution from the molded article by subjecting the core to the influence of water.

2. The proces of making hollow articles which consists in introducing unsolidified material into the cavity between a mold and a solid core, soluble in water and having a higher melting point than that of said material, applying pressure and heat to said material to render it temporarily plastic and shape it to the contour of the mold and core, reducing the temperature of the molded material to enable it to solidify, removing the solidified material together with the core from the mold, and extracting the core without raising the temperature of the molded material.

3. The process of molding hollow articles which consists in introducing material into the cavity between a mold and a solid core soluble in water and having a melting point greater than that of said material and into contact with said core, then applying pressure and heat to said material to render it plastic and to shape it to the contour of the mold and core, then reducing the temperature of the molded material to enable it to solidify, and then dissolving the core by means of water.

4. The process of molding hollow articles which consists in introducing material into the cavity between a mold and a solid core soluble in water and having a melting point greater than that of said material and into contact with said core, the coefficient of cubical expansion of said core being approximately equal to that of said material, then applying pressure and heat to said material to render it plastic and to shape it to the contour of the mold and core, then reducing the temperature of the molded material to enable it to solidify, and then dissolving the core by means of water.

5. The process of molding hollow articles which consists in introducing material into the cavity between a mold and a solid core soluble in water and having a melting point greater than that of said material and into contact with said core, the coefficient of cubical expansion of said core being not less than that of said material, then applying pressure and heat to said material to render it plastic and shape it to the contour of the mold and core, then reducing the temperature of the molded material to enable it to solidify, and then dissolving the core by means of water.

6. An apparatus for use in making hollow articles comprising a mold for shaping the exterior of the article, and a core soluble in water arranged within the mold for shaping the interior of the article, said core being constructed to withstand high temperature and pressure during the molding operation without being fused or distorted.

7. As an article of manufacture, a solid molding core composed of material soluble in water and having a high melting point compacted together under high pressure to present a uniformly hard and smooth surface to the material to be molded.

8. As an article of manufacture, a solid molding core composed of sodium chloride and molded into shape under high pressure to provide a smooth hard surface.

9. As an article of manufacture, a molding core composed of sodium chloride and molded into shape under high pressure to provide a smooth hard surface, capable of being further compressed and contracted by the force of the shrinking material which is being molded thereon.

10. As an article of manufacture a core for molding temporarily plastic material consisting of material soluble in water and having a melting point greater than that of said temporarily plastic material.

11. As an article of manufacture a core for molding temporarily plastic material consisting of material soluble in water and having a coefficient of cubical expansion approximately equal to that of said temporarily plastic material.

12. As an article of manufacture a core for molding temporarily plastic material consisting of material soluble in water and having a coefficient of cubical expansion not less than that of said temporarily plastic material.

13. A step in the process of molding hollow articles which consists in positioning temporarily plastic material around and in contact with a core soluble in water, the core having a higher melting point than that of the material.

14. A step in the process of molding hollow articles which consists in positioning temporarily plastic material around and in contact with a core soluble in water, the core having a coefficient of cubical expansion approximately equal to that of said temporarily plastic material.

15. A step in the process of molding hollow articles which consists in positioning temporarily plastic material around and in contact with a core soluble in water, the core having a coefficient of cubical expansion not less than that of said temporarily plastic material.

In testimony whereof I have affixed my signature.

MILTON ALDEN.